United States Patent
Sutton et al.

(10) Patent No.: US 6,692,052 B1
(45) Date of Patent: Feb. 17, 2004

(54) CAB BODY MOUNTING HAVING A LOAD SHARING FEATURE FOR LIMITING SHEARING STRESS IN A FASTENER OF THE MOUNTING

(75) Inventors: Anthony D. Sutton, Fort Wayne, IN (US); Brian M. Millard, Fort Wayne, IN (US); Randall L. Schreiber, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/322,009

(22) Filed: Dec. 17, 2002

(51) Int. Cl.$^7$ ............................................... B62D 24/04
(52) U.S. Cl. .................. 296/35.2; 296/35.1; 280/784; 267/276; 267/281
(58) Field of Search ............................. 296/35.1, 35.2, 296/35.3; 267/273, 276, 279, 281; 248/531, 609; 280/784

(56) References Cited

U.S. PATENT DOCUMENTS

| | | | | |
|---|---|---|---|---|
| 2,171,947 A | * | 9/1939 | Parker | 296/35.1 |
| 4,061,392 A | * | 12/1977 | Lowder et al. | 296/190.03 |
| 4,143,903 A | * | 3/1979 | Yoshida et al. | 296/35.1 |
| 6,030,016 A | * | 2/2000 | Rice | 296/35.1 |
| 6,168,229 B1 | * | 1/2001 | Kooi et al. | 296/190.07 |
| 6,439,651 B1 | * | 8/2002 | Johansson et al. | 296/190.07 |

* cited by examiner

*Primary Examiner*—Dennis H. Pedder
*Assistant Examiner*—Patricia Engle
(74) *Attorney, Agent, or Firm*—Jeffrey P. Calfa; Dennis Kelly Sullivan; Susan L. Lukasik

(57) ABSTRACT

A cab body mounting (100) in a vehicle has a frame-side bracket (102) attached to a chassis frame side rail (18) and a body-side bracket (104) attached to a cab body rail (16). An elastomeric bushing (108) and a fastener (109) associate brackets 102, 104 so as to allow limited motion between them accompanied by bushing deformation. Bracket (102) has an upright wall (110) that is spaced a distance from an end (16E) of rail (16). A sufficiently large relative acceleration of the body on the frame, such as during a frontal impact, will cause an edge portion of bracket (104) to abut wall (110), which arrests further movement of the bracket in the fore-aft direction, and thereby shares the loading that is being imposed on the mounting due to the acceleration force. This occurs before the stress in the shank of fastener (109) reaches the characteristic maximum allowable shearing stress for the fastener material.

15 Claims, 5 Drawing Sheets

CAB BODY MOUNTING HAVING A LOAD SHARING FEATURE FOR LIMITING SHEARING STRESS IN A FASTENER OF THE MOUNTING

FIELD OF THE INVENTION

This invention relates to a mounting that mounts a cab body on a chassis frame in a wheeled land vehicle. More particularly, the invention relates to an improvement for limiting shearing stress created in a fastener that fastens a bracket of the mounting to a member of the cab body when large relative acceleration between the cab body and the chassis frame occurs in a fore-aft direction in a vehicle. Such large accelerations can occur during extreme frontal impacts of the vehicle with other objects.

BACKGROUND AND SUMMARY OF THE INVENTION

In the event of frontal impact of the vehicle with a foreign object, relative acceleration of the body on the frame in the fore-aft direction may occur. Severe frontal impacts may create large acceleration forces. The component of such forces in the fore-aft direction creates shearing stress in the fastener of a known mounting that will be discussed later in connection with FIGS. 1 and 2. The fastener material has a characteristic maximum allowable shearing stress. Severe unchecked forces may create stress levels exceeding the maximum allowable shearing stress for the fastener. The fastener is therefore at risk of shearing and the vehicle is at risk for potentially adverse consequences of such shearing.

For minimizing the risks, the fastener can obviously be made larger. But size may become a concern, not only from the standpoint of available space in the vehicle, but also from the standpoint of assembly operations in a vehicle assembly plant where vehicles are mass-produced on an assembly line. For example, not all vehicles coming down the line may require larger fasteners. In that case, multiple tools, such as air wrenches, must be available for installing the differently sized fasteners, and that introduces assembly line complications that involve extra time, space, and expense.

It is therefore seen desirable if such complications could be avoided. It is toward that objective, for one, that the present invention is directed.

One general aspect of the invention relates to a wheeled land vehicle comprising a chassis frame and a cab body mounted on the chassis frame by a mounting that comprises a frame-side bracket attached to a chassis frame member and a body-side bracket attached to a cab body member. A fastener attaches one of the brackets to the corresponding member and experiences shearing stress as one of the chassis frame and the cab body accelerates relative to the other with a component of motion along a fore-aft dimension of the vehicle. A structure that includes an elastomer through which the two brackets are associated in an assembly relationship allows limited motion between the brackets in multiple dimensions accompanied by deformation of the elastomer, one of the multiple dimensions being the fore-aft dimension of the vehicle. The other bracket comprises a formation that, when the elastomer is not being deformed by acceleration forces, is spaced a predetermined distance apart along the fore-aft dimension of the vehicle from the member to which the one bracket is attached by the fastener. The formation is also disposed for abutment by the member to which the one bracket is attached by the fastener for arresting motion of the cab body relative to the chassis frame when a component of acceleration force along the fore-aft dimension of the vehicle displaces the cab body relative to the chassis frame sufficiently to reduce to zero the spacing between the formation and the member to which the one bracket is attached by the fastener. The arrest occurs before shearing stress in the fastener exceeds the maximum allowable shearing stress for the fastener.

Another general aspect of the invention relates to a mounting for a cab body on a chassis frame of a wheeled land vehicle comprising a frame-side bracket for attachment to a chassis frame member and a body-side bracket for attachment to a cab body member. One bracket comprises a face containing a hole and spaced apart, mutually confronting, vertical flanges at opposite sides of the face. A first fastener passes vertically through the hole in the face to attach the one bracket to the corresponding member. A structure through which the two brackets are associated in an assembly relationship comprises an annular, deformable elastomeric bushing having a central axis that is horizontal and also comprises an outer circumference disposed in a hole in the other bracket such that the central axis of the bushing is perpendicular to the fore-aft dimension of the vehicle. A second fastener passes horizontally through aligned holes in one flange of the one bracket, the bushing, and the other flange of the one bracket perpendicular to a fore-aft dimension of the vehicle. The other bracket comprises a vertical wall that confronts, and is in spaced relation to, the horizontal face of the one bracket when the elastomeric bushing is in an undeformed condition.

Another general aspect of the invention relates to a method of limiting shearing stress in a first fastener that fastens one of two brackets of a mounting to one of a cab body member and a chassis frame member in a wheeled land vehicle caused by relative acceleration between the two members having a component of motion along a fore-aft dimension of the vehicle. The mounting comprises a structure through which the two brackets are associated in an assembly relationship. The structure comprises an elastomer and a second fastener that allow limited motion between the brackets in multiple dimensions accompanied by deformation of the elastomer, one of the multiple dimensions being the fore-aft dimension of the vehicle. The method comprises providing the other bracket with a formation that is disposed to be abutted by the one member to which the one bracket is fastened by the first fastener for arresting motion of the one member relative to the other member when a component of acceleration force along the fore-aft dimension of the vehicle displaces the one member relative to the other member. The arrest occurs after a predetermined amount of relative motion that assures that shearing stress created in the fastener does not exceed the maximum allowable shearing stress for the fastener.

The foregoing, along with further aspects, features, and advantages of the invention, will be seen in the following disclosure of a presently preferred embodiment of the invention depicting the best mode contemplated at this time for carrying out the invention. The disclosure includes drawings, briefly described as follows.

DESCRIPTION OF CERTAIN PRIOR ART

Figure 1:
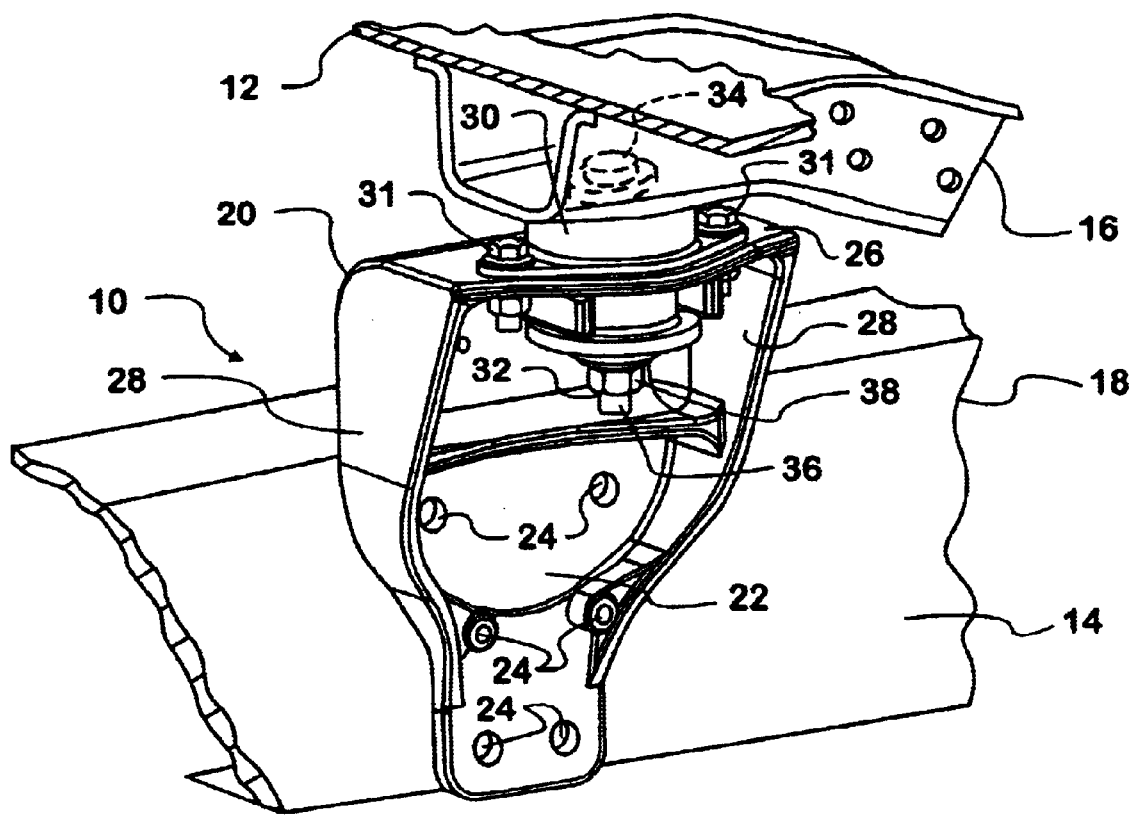
FIGS. 1 and 2 are respective views of prior art that illustrate a known mounting.
Figure 2:
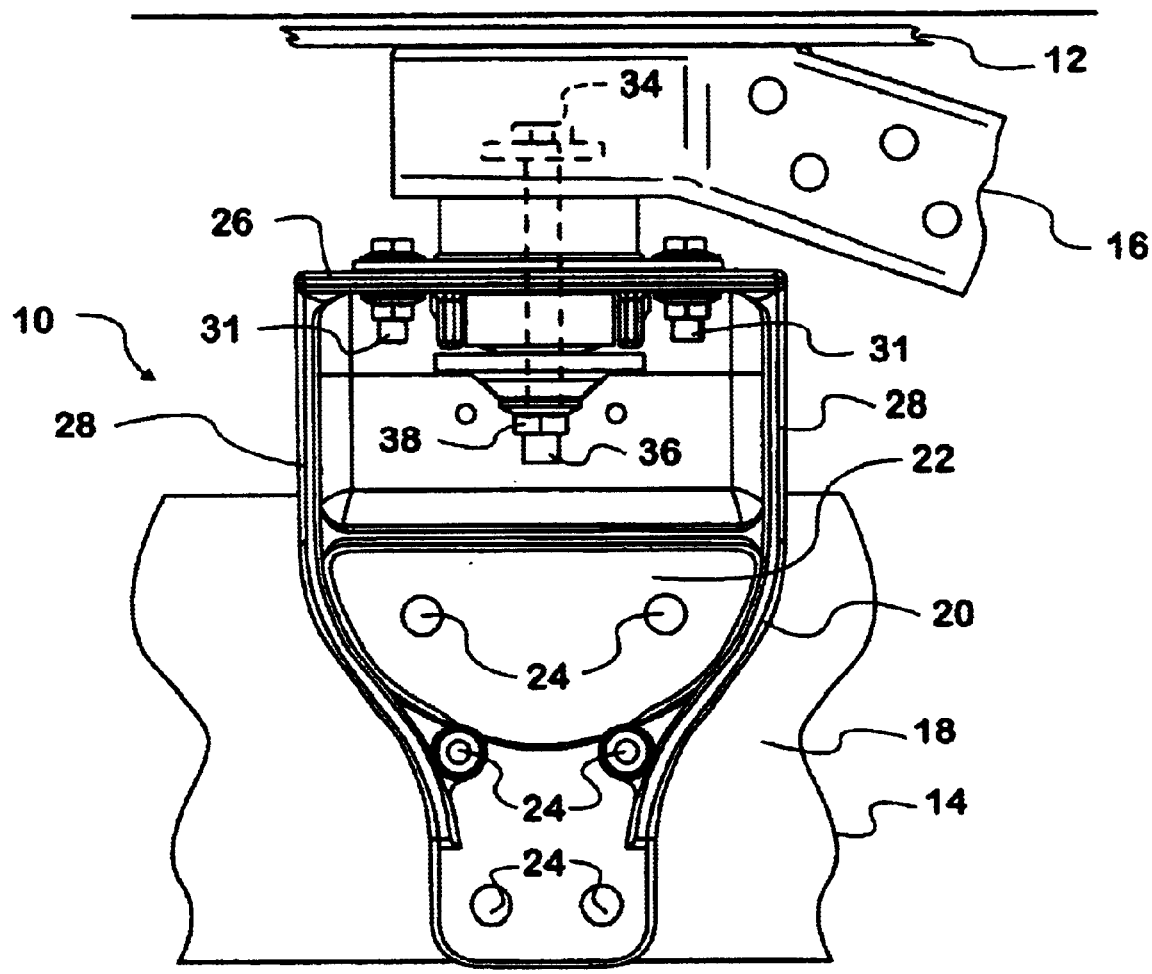

FIGS. 1 and 2 shows a known mounting 10 for mounting a cab body 12 on a chassis frame 14 in a motor vehicle such as a heavy truck for example. Body 12 comprises a rail member 16 that is shaped to fit to the floor structure of the cab body and provide both rigidity to the cab floor and a means for mounting the cab on frame 14. Typically a cab body has two such rail members that run fore and aft in the vehicle and are located inboard of the sides of the cab floor.

Chassis frame 14 comprises a side rail member 18 that runs along one side of the chassis in the fore-aft direction in the vehicle. The other side of the frame also has a side rail member, with the frame being completed by a series of cross members that bridge the side rail members at various locations along the length of the frame, the second side rail member and the cross members not being shown in FIGS. 1 and 2.

Several mountings mount cab body 12 on a chassis frame 14, and mounting 10 is an example of one of them. It comprises a frame-side bracket 20 having a vertical wall 22 that is disposed against the side of side rail member 18 and fastened to rail member 18 by fasteners that pass through holes 24 in wall 22 that align with holes in rail member 18. Bracket 20 further comprises a generally horizontal platform wall 26 cantilevered on vertical wall 22, supported by diagonal bracing walls 28, and suitably located for attachment to body rail member 16. The attachment structure includes an elastomeric bushing 30 and a fastener 32. Bushing is confined with a suitable structure fitted to a hole in wall 26 and fastened by fasteners 31. Fastener 32 comprises a head 34 and a shank 36 that passes downward through a hole in member 16, through a hole in bushing 30, and through a hole in wall 26. A nut 38 secures the fastener, compressing the bushing in the process.

The mounting serves to secure the cab body on the frame with some degree of resiliency that may incidentally serve to attenuate the transmission of certain vibrations from the frame to the cab. The mounting therefore accommodates some slight relative movement between the cab and frame.

In the event of frontal impact of the vehicle with another object, relative acceleration of the body on the frame in the fore-aft direction may occur. Severe frontal impacts may create large acceleration forces. The component of such forces in the fore-aft direction creates shearing stress in fastener shank 36. The material of fastener 32 has a characteristic maximum allowable shearing stress. Severe unchecked forces may create stress levels exceeding the maximum allowable shearing stress for the fastener. The fastener is therefore at risk of shearing and the vehicle is at risk for potentially adverse consequences of such shearing.

For minimizing the risks, the fastener can obviously be made larger. But, as discussed earlier, size may become a concern, not only from the standpoint of available space in the vehicle, but also from the standpoint of assembly operations in a vehicle assembly plant where vehicles are mass-produced on an assembly line. The present invention, as disclosed by example in FIGS. 3–5, seeks to avoid complications arising from a need to have different sized assembly tools for installing different size fasteners in cab body mountings on a chassis frame.

DESCRIPTION OF THE PREFERRED EMBODIMENT

Figure 3:
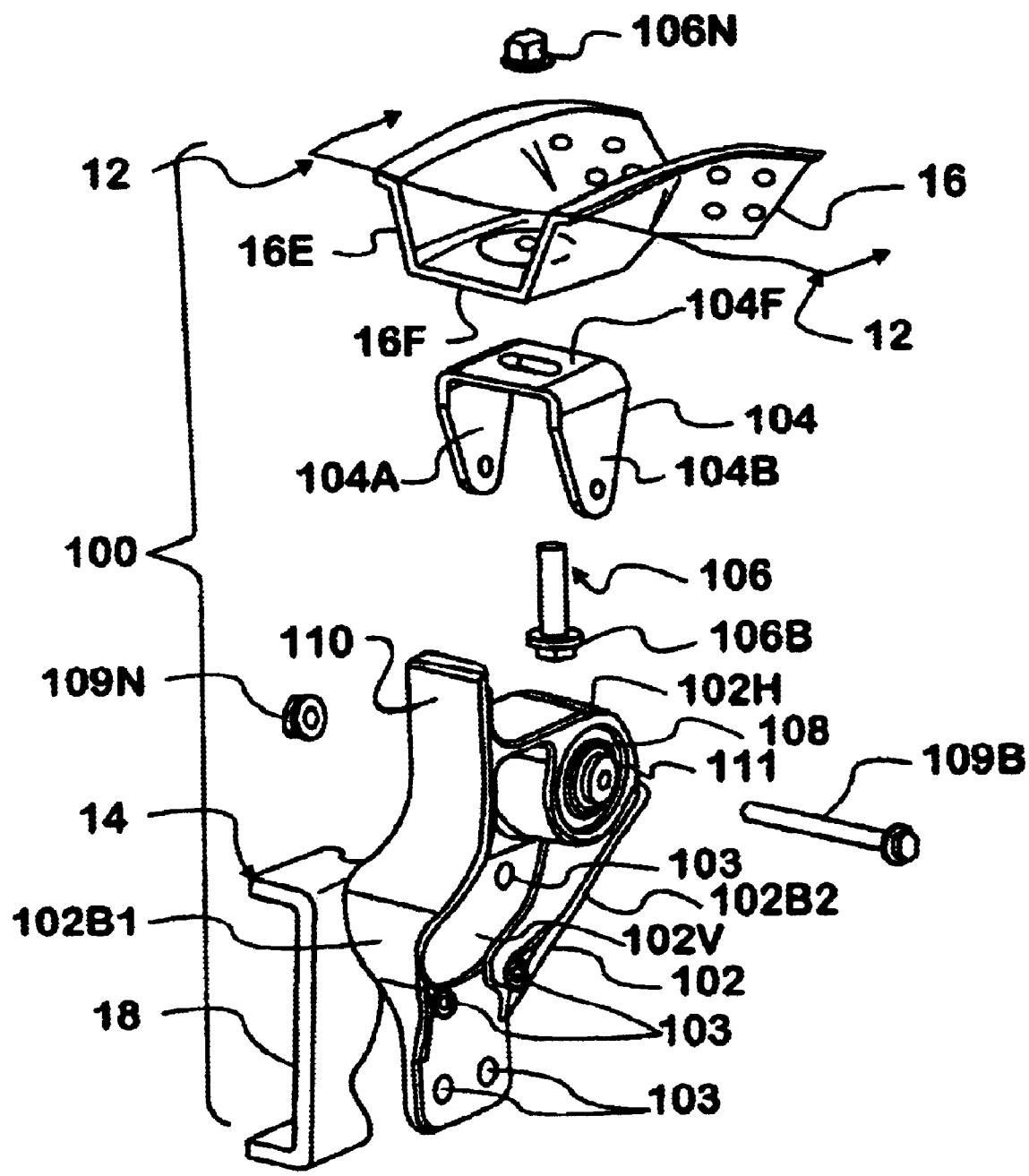
FIG. 3 is an exploded perspective view of a mounting embodying principles of the present invention.
Figure 4:
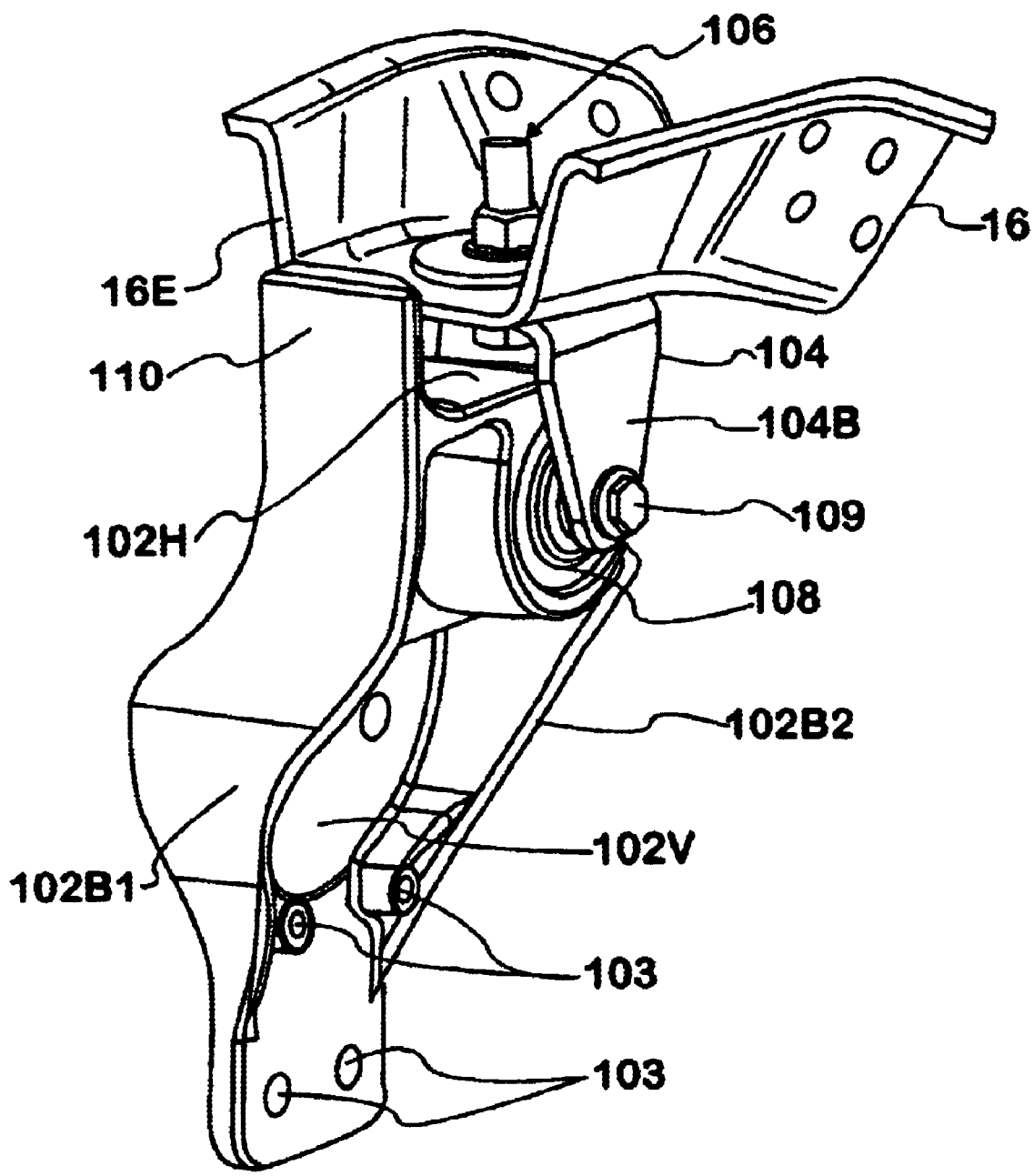
FIG. 4 is a non-exploded perspective view of the inventive mounting.
Figure 5:
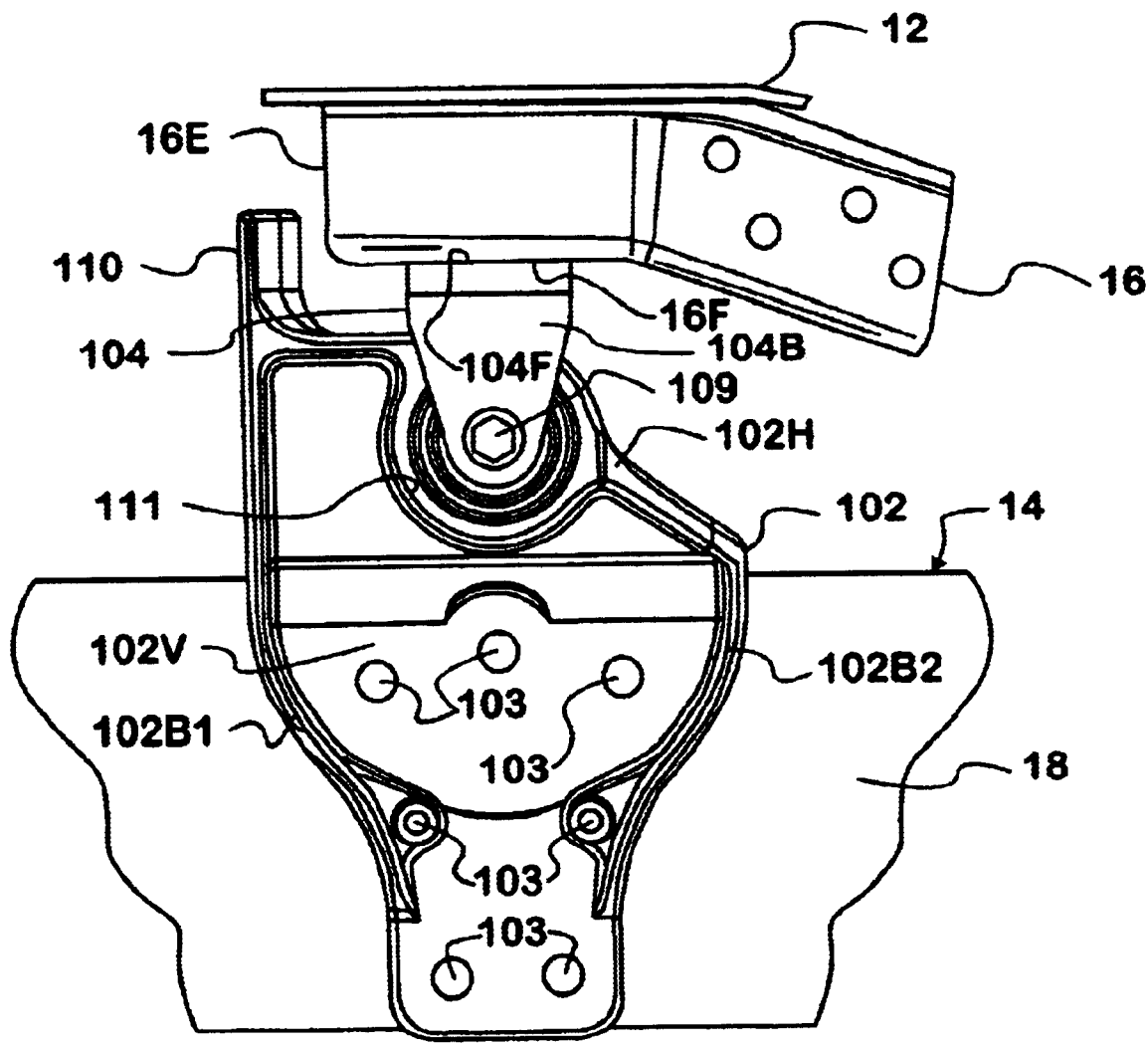
FIG. 5 is a side elevation view of FIG. 4.

FIGS. 3–5 show the inventive mounting 100 for mounting cab body 12 on chassis frame 14 in a motor vehicle such as a heavy truck for example. Body 12 comprises rail members 16 as described earlier. Chassis frame 14 comprises side rail members 18 as also described earlier. Several mountings 100 may mount cab body 12 on chassis frame 14, although only one is shown here.

Mounting 100 comprises a frame-side bracket 102 and a body-side bracket 104. The former is attached to chassis frame side rail member 18 and the latter to cab body rail member 16. A fastener 106 that comprises a bolt 106B and a nut 106N attaches bracket 104 to rail 16, as shown. Bracket 104 and rail member 16 comprise respective abutted faces 104F, 16F. Fastener 106 comprises a shank that passes through aligned holes in the abutted faces and that has a central axis disposed substantially along a vertical dimension of the vehicle. Fastener 106 is subject to shearing stress as one of the chassis frame and the cab body accelerates relative to the other with a component of motion along a fore-aft dimension of the vehicle. Bracket 102 has a vertical wall 102V that is disposed against the side of side rail member 18 and fastened to rail member 18 by fasteners (not shown) that pass through holes 103 in wall 102V that align with holes in rail member 18. Bracket 102 further comprises a top wall 102H extending at a right angle from the top of vertical wall 102V and running between bracing walls 102B1, 102B2 that extend at right angles from the fore and aft vertical sides of wall 102V.

A structure that includes an elastomeric bushing 108 and a second fastener 109 associates brackets 102, 104 in an assembly relationship that allows limited motion between the brackets in multiple dimensions accompanied by deformation of bushing 108. One of the multiple dimensions is the fore-aft dimension of the vehicle. Body-side bracket 104 comprises spaced apart, mutually confronting flanges 104A, 104B depending downwardly from opposite sides of its face 104F. Fastener 109 comprises a bolt 109B that passes through aligned holes in one body-side bracket flange, the bushing, and the other body-side bracket flange and a nut 109N that is tightened onto the shank end of the bolt. Bushing 108 is annular in shape and has an outer circumference bonded to the inside diameter of an outer metal sleeve that is disposed in a hole 111 in frame-side bracket 102, such as by being pressed into the hole. As shown in the drawings, a portion of the marginal circumference of hole 111 is common with a portion of wall 102H. The bushing also has an inner circumference to which the outside diameter of an inner metal sleeve is bonded, and it is through this inner sleeve that the shank of fastener 109 passes.

Bracket 102 comprises an upright wall 110 that, when bushing 108 is not being deformed by acceleration forces, is spaced a predetermined distance apart along the fore-aft dimension of the vehicle from the end 16E of member 16. Bracket 102 is attached to member 16 by fastener 106 a short distance aft of end 16E. Wall 110 extends upward from the fore end of top wall 102H as an extension of wall 102B1 so as to be disposed for abutment by the end 16E of member 16 for arresting motion of the cab body relative to the chassis frame when a component of acceleration force along the fore-aft dimension of the vehicle displaces the cab body relative to the chassis frame sufficiently to reduce the spacing between the wall and the end of the member to zero. The arrest occurs before shearing stress in the fastener exceeds the maximum allowable shearing stress for the fastener.

In the event of severe frontal impact of the vehicle with another object, the component of such force in the fore-aft direction creates shearing stress in the shank of fastener 106 as the two brackets move relative to each other. A sufficiently large force will move the brackets to the extent that the and 16E of member 16 abuts wall 110. When that happens, the wall arrests further relative movement in the fore-aft direction, and thereby shares the loading that is being imposed on the mounting due to the acceleration force. This occurs before the stress in the fastener shank reaches the characteristic maximum allowable shearing stress for the fastener material.

While a presently preferred embodiment of the invention has been illustrated and described, it should be appreciated that principles of the invention are applicable to all embodiments that fall within the scope of the following claims.

What is claimed is:

1. A wheeled land vehicle comprising a chassis frame and a cab body mounted on the chassis frame by a mounting that comprises a frame-side bracket attached to a chassis frame member and a body-side bracket attached to a cab body member, a fastener that attaches one of the brackets to the corresponding member and that experiences shearing stress as one of the chassis frame and the cab body accelerates relative to the other with a component of motion along a fore-aft dimension of the vehicle, and a structure that includes an elastomer through which the two brackets are associated in an assembly relationship that allows limited motion between the brackets in multiple dimensions accompanied by deformation of the elastomer, one of the multiple dimensions being the fore-aft dimension of the vehicle, wherein the other bracket comprises a formation that, when the elastomer is not being deformed by acceleration forces, is spaced a predetermined distance apart along the fore-aft dimension of the vehicle from the member to which the one bracket is attached by the fastener and is disposed for abutment by the member to which the one bracket is attached by the fastener for arresting motion of the cab body relative to the chassis frame when a component of acceleration force along the fore-aft dimension of the vehicle displaces the cab body relative to the chassis frame sufficiently to reduce to zero the spacing between the formation and the member to which the one bracket is attached by the fastener, and the arrest occurs before shearing stress in the fastener exceeds the maximum allowable shearing stress for the fastener.

2. A wheeled land vehicle as set forth in claim 1 wherein the one bracket is the body-side bracket, and the other bracket is the frame-side bracket.

3. A wheeled land vehicle as set forth in claim 2 wherein the body-side bracket and the cab body member comprise respective abutted faces, and the fastener comprises a shank that passes through aligned holes in the abutted faces and that has a central axis disposed substantially along a vertical dimension of the vehicle.

4. A wheeled land vehicle as set forth in claim 3 wherein the body-side bracket comprises spaced apart, mutually confronting flanges depending downwardly from opposite sides of its face and the structure that includes an elastomer through which the two brackets are associated in an assembly relationship that allows limited motion between the brackets in multiple dimensions accompanied by deformation of the elastomer comprises another fastener that passes through aligned holes in one body-side bracket flange, the elastomer, and the other body-side bracket flange.

5. A wheeled land vehicle as set forth in claim 4 wherein the elastomer comprises an annular bushing having an outer circumference disposed in a hole in the frame-side bracket.

6. A wheeled land vehicle as set forth in claim 5 wherein the fastener that passes through aligned holes in one body-side bracket flange, the elastomer, and the other body-side bracket comprises a central axis that is disposed generally horizontal and generally perpendicular to the fore-aft dimension of the vehicle.

7. A wheeled land vehicle as set forth in claim 6 wherein the formation of the one bracket comprises an upright wall that is disposed fore of the bushing along the fore-aft dimension of the vehicle and above the bushing along the vertical dimension of the vehicle.

8. A wheeled land vehicle as set forth in claim 1 wherein the one bracket and the member to which the one bracket is attached comprise respective abutted faces, and the fastener comprises a shank that passes through aligned holes in the abutted faces and that has a central axis disposed substantially along a vertical dimension of the vehicle.

9. A wheeled land vehicle as set forth in claim 8 wherein the one bracket comprises spaced apart, mutually confronting flanges at opposite sides of its face and the structure that includes an elastomer through which the two brackets are associated in an assembly relationship that allows limited motion between the brackets in multiple dimensions accompanied by deformation of the elastomer comprises another fastener that passes through aligned holes in one flange of the one bracket, the elastomer, and the other flange of the one bracket.

10. A wheeled land vehicle as set forth in claim 9 wherein the elastomer comprises an annular bushing having an outer circumference disposed in a hole in the other bracket, and the fastener that passes through aligned holes in one flange of the one bracket, the elastomer, and the other flange of the one bracket has a central axis that is disposed generally horizontal and generally perpendicular to the fore-aft dimension of the vehicle.

11. A wheeled land vehicle as set forth in claim 10 wherein the formation comprises an upright wall that is spaced from the hole in the other bracket both along the fore-aft dimension of the vehicle and along the vertical dimension of the vehicle.

12. A mounting for a cab body on a chassis frame of a wheeled land vehicle comprising a frame-side bracket for attachment to a chassis frame member and a body-side bracket for attachment to a cab body member, one bracket comprising a face containing a hole and spaced apart, mutually confronting, vertical flanges at opposite sides of the face, a first fastener for passing vertically through the hole in the face to attach the one bracket to the corresponding member, and a structure through which the two brackets are associated in an assembly relationship, the structure comprising an annular, deformable elastomeric bushing having a central axis that is horizontal and comprising an outer circumference disposed in a hole in the other bracket such that the central axis of the bushing is perpendicular to the fore-aft dimension of the vehicle and a second fastener that passes horizontally through aligned holes in one flange of the one bracket, the bushing, and the other flange of the one bracket perpendicular to a fore-aft dimension of the vehicle, and the other bracket comprising a vertical wall that confronts, and is in spaced relation to, the horizontal face of the one bracket when the elastomeric bushing is in an undeformed condition.

13. A mounting as set forth in claim 12 wherein the one bracket is the body-side bracket, and the other bracket is the frame-side bracket.

14. A mounting as set forth in claim 12 wherein the frame-side bracket comprises a series of holes disposed vertically below the bushing.

15. A method of limiting shearing stress in a first fastener that fastens one of two brackets of a mounting to one of a cab body member and a chassis frame member in a wheeled land vehicle caused by relative acceleration between the two members having a component of motion along a fore-aft dimension of the vehicle, wherein the mounting comprises a structure through which the two brackets are associated in an assembly relationship, the structure comprising an elastomer and a second fastener that allow limited motion between the brackets in multiple dimensions accompanied by deformation of the elastomer, one of the multiple dimensions being the fore-aft dimension of the vehicle, the method comprising providing the other bracket with a formation that is disposed to be abutted by the one member to which the one bracket is fastened by the first fastener for arresting motion of the one member relative to the other member when a component of acceleration force along the fore-aft dimension of the vehicle displaces the one member relative to the other member, and the arrest occurring after a predetermined amount of relative motion that assures that shearing stress created in the fastener does not exceed the maximum allowable shearing stress for the fastener.

* * * * *